Dec. 8, 1936.   J. LUNOE ET AL   2,063,451
ILLUMINATING DEVICE
Filed May 4, 1934   4 Sheets-Sheet 1
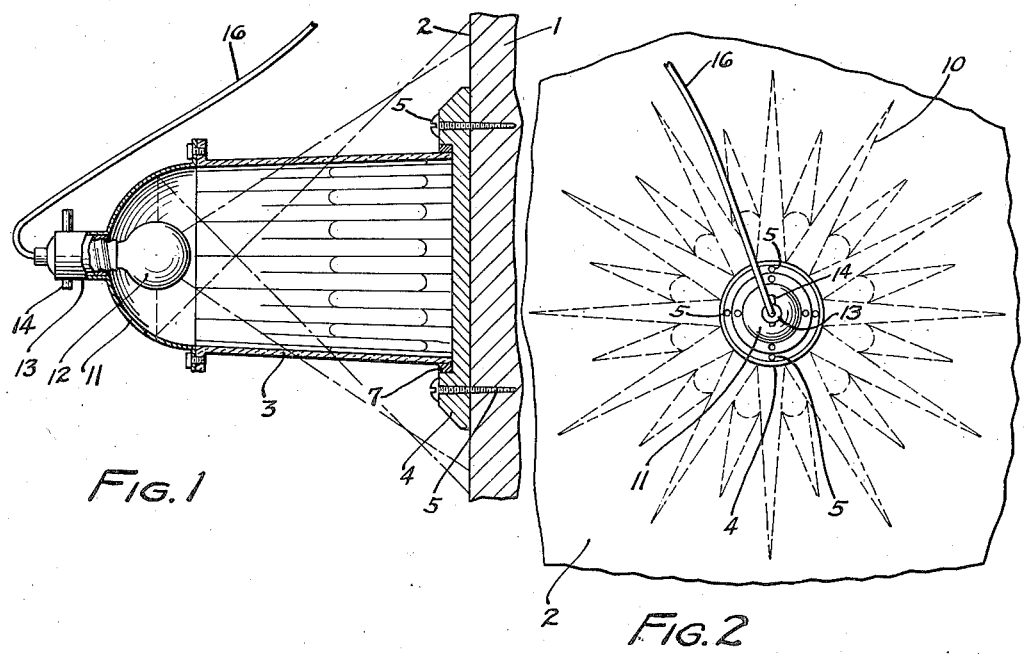
FIG. 1
FIG. 2
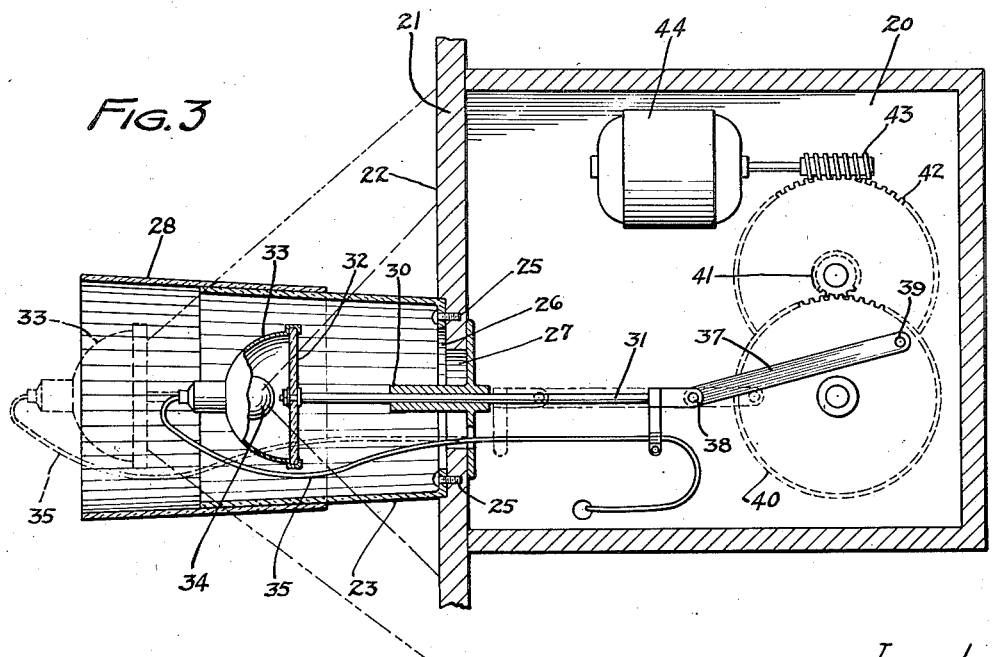
FIG. 3
Inventors
JOSEPH LUNOE
MAURITZ C. RANSEEN
By
ATTORNEYS Dec. 8, 1936.  J. LUNOE ET AL  2,063,451
ILLUMINATING DEVICE
Filed May 4, 1934   4 Sheets-Sheet 2

Inventors
JOSEPH LUNOE
MAURITZ C. RANSEEN
By Paul, Paul & Moore
ATTORNEYS

Dec. 8, 1936.   J. LUNOE ET AL   2,063,451
ILLUMINATING DEVICE
Filed May 4, 1934   4 Sheets-Sheet 3

Inventors
JOSEPH LUNOE
MAURITZ C. RANSEEN
ATTORNEYS

Dec. 8, 1936.   J. LUNOE ET AL   2,063,451
ILLUMINATING DEVICE
Filed May 4, 1934   4 Sheets-Sheet 4

Inventors
JOSEPH LUNOE
MAURITZ C. RANSEEN
By Paul, Paul & Moore
ATTORNEYS

Patented Dec. 8, 1936

2,063,451

UNITED STATES PATENT OFFICE 2,063,451

ILLUMINATING DEVICE

Joseph Lunoe and Mauritz C. Ranseen, Minneapolis, Minn.; said Ranseen assignor to said Lunoe Application May 4, 1934, Serial No. 723,931

23 Claims. (Cl. 240—10.1)

This invention relates to improvements in illuminating devices and has as its main objects: the production of attractive light figures on any suitable surface, and/or the production of kaleidoscopic lighting effects. Other objects are: to provide specific means for producing these effects; and to provide means for constantly changing the shape and color of the light images thrown on any suitable surface.

All details of construction and arrangement of all parts of all figures of the drawings are features and are claimed, along with the broader ideas of means inherent in the disclosure.

Objects, features and advantages of the invention will be set forth in the description of the drawings forming a part of this application, and in said drawings Figure 1 is a longitudinal section illustrating one form of the invention;

Figure 2 is a front view illustrating the general character of the light images which are producible by the operation of the device;

Figure 3 is a vertical longitudinal section of a modification in which the light-directing means moves with reference to a transparent member which the light traverses to impinge the image-receiving surface;

Figure 4:
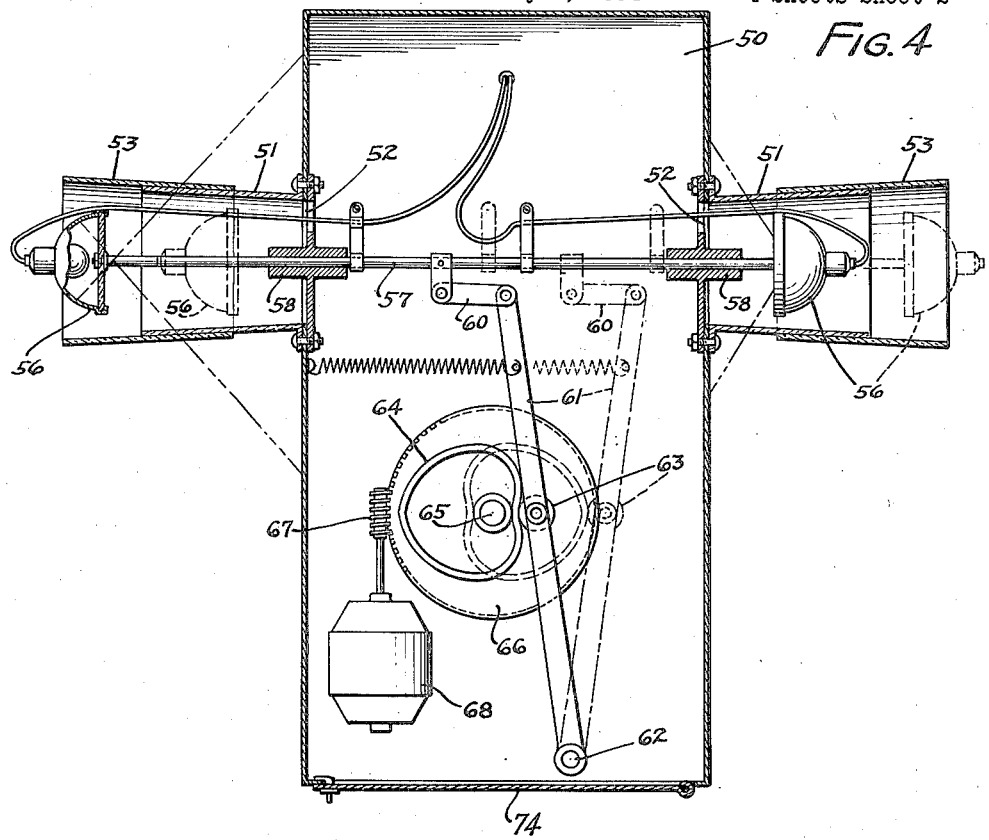
Figure 4 is a vertical section of another form of the invention in which two light-directing means are simultaneously moved to create lighting effects in each of two corresponding light tubes.

Referring to Figure 1, the numeral 1 indicates a wall or other structure having a surface 2 to be illuminated. A tubular element made of light-transmitting material, either transparent or translucent, is indicated at 3. This element may be of any desired configuration and may be tapered in either direction. This element may have means such as a block 4 by which it can be secured by one end to the surface 2. This block 4 is secured to wall 1 by suitable fastening devices 5. The tubular element 3 has one end secured to the block by any suitable means such as cement or packing indicated at 7. The element 3 is thus secured so that light can be directed into it to pass through its wall and impinge the surface 2.

The tubular element has means associated therewith in any suitable manner for modifying the light to obtain figured or other kinds of illumination on the surface, the said figured illumination being indicated in Figure 2 at 10. This last mentioned means in this instance includes ribs extending axially or longitudinally of the tubular element and arranged on its outer surface, and having convex sides facing outwardly or radially. This means, of course, may be changed to obtain any desired kind of modified illumination on the surface, and constitutes means in association with light-directing means for effecting the production of attractive lighting effects through the wall of the tubular element onto any suitable surface, whether the element is attached to the surface or not.

The term "light-directing means" as used herein connotes either a lamp or equivalent lighting device alone or a lamp and a reflector arranged in any proper relation as a unit, and movable or immovable, or a reflector alone. It is, of course, understood that there is no intention to limit the broader aspects of the invention to the character of the light, how it is mounted, or what it is mounted upon.

This light-directing means may be either mounted upon the outer end of the tube 3, that is carried by the tube 3, or may be mounted on a separate support. In this instance, it comprises a suitable reflector 11 and an electric light bulb 12 arranged in a suitable socket 13 of the reflector, and the assembly includes a switch 14. The power cable is indicated at 16. Various forms of ornamentation may be applied to either the inner or outer surface of the tubular element 3 and the transparent material may be colored. The light of the bulb 12 is reflected and caused to traverse the wall of the tube to be so modified as to produce an attractive image, or coloration on the surface 2.

In Figure 3 is shown a modification which includes a housing 20 having a wall 21 the front surface 22 of which is to be illuminated. Attached to this surface is a tubular element 23 made of light-transmitting material. This element has the general form of an ordinary drinking glass, and is attached by its bottom to the wall 3 by suitable fastening devices 25. There is an opening 26 provided in the bottom, and in the wall 22 is another opening 27 in register with the opening 26. In telescopic relation with the element 23 is a second element 28 also of light-transmitting material, and in this instance both elements are tapered convergently toward the surface 22. By this telescopic arrangement or overlap, to provide two thicknesses of the material, the lighting effect may be varied by axially adjusting the element 28. Moreover, a moving light may be provided as hereinafter shown, and motion of the light back and forth within the tubes gives correspondingly variable illuminating effects.

To the above end, there is mounted on the wall 22 a bearing 30 which may or may not project through the openings 26 and 27. Slidable in this bearing is a rod 31 attached at one end to the lens 32 of a reflector casing 33. The light bulb is indicated at 34. The power cable is indicated at 35 and passes through the openings 26 and 27 into the housing 20. In this instance, the light-directing means is moved automatically alternately in opposite directions within the tubular elements. This means comprises link 37 pivoted to the rod 31 as at 38 and also pivoted as at 39 to a gear wheel 40 meshing with the spur pinion 41, rotating with worm wheel 42, cooperating with companion worm 43 which is operated by a constant speed motor 44. By this mechanism, the light is oscillated to give constantly changing lighting effects on surface 22.

Another modification is shown in Figure 4, which has some features in common with the arrangement of Figure 3, but includes two telescopically arranged groups of tubular elements, each element of each group being, of course, made of light-transmitting material. A housing or boxing is indicated at 50. The members 51 are open at both ends and are suitably attached to the boxing in register with the openings 52. These members are axially aligned. The outer telescopic members are indicated at 53. Each light-directing means is generally indicated at 56, one for each telescopic group. The construction of the light-directing means may be and preferably is the same as shown in Figure 3.

The operating rod is indicated at 57 and is slidably held in bearings 58. For operating the rod, there is provided a link 60 pivoted at one end to a bracket carried by the rod 57. At the other end this link is pivoted to an oscillating arm 61 pivoted at 62 and having a roller 63 engaging a cam 64. The cam is on shaft 65 which also carries worm gear 66 meshing with worm 67 operated by a constant speed motor 68. The light-directing means 56 are simultaneously moved within the transparent tubular elements.

Figure 5:
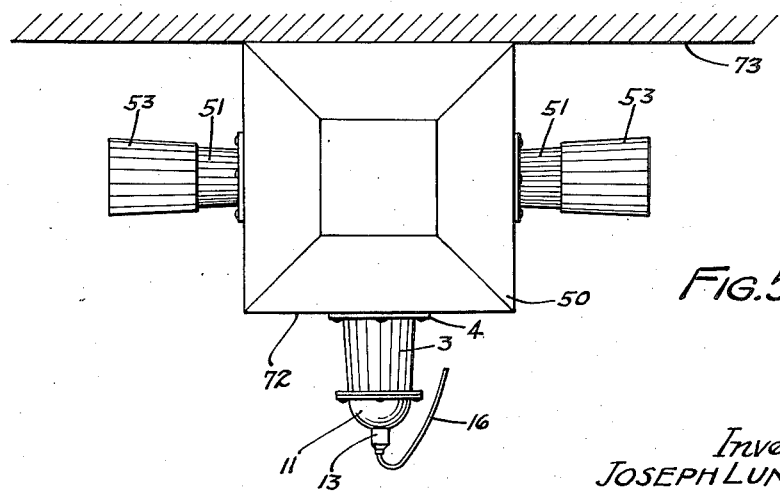
Figure 5 is a plan view of the device of Figure 4.

In addition to the elements 51, 53, etc., the box also carries a device for illuminating the surface 72. This device is of the type shown in Figure 1 and the reference numerals correspond to those of Figure 1. The device of Figure 5, as a whole, is also a feature of the invention, and can be attached to a wall 73, which will also receive figured and varying illuminative effects as a result of motion of the lights in the tubular elements. A suitable door 74 is provided for giving access to the mechanism of the housing 50. It will of course be understood that doors for a similar purpose are provided wherever needed.

Figures 6, 7:
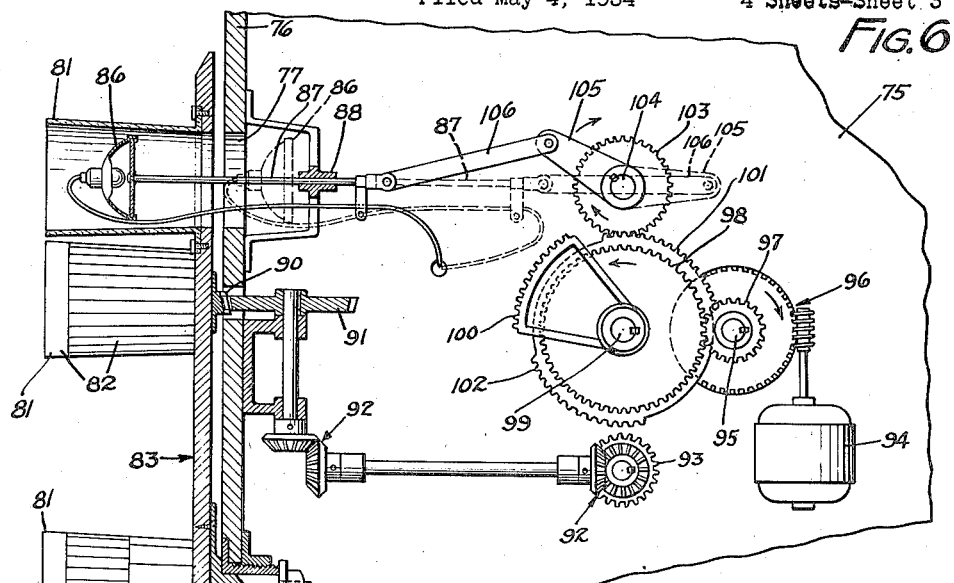
Figure 6 is a vertical section of a modification in which a plurality of transparent tubular elements are successively moved into a predetermined relation to a light-directing means.
Figure 7 is a front elevation of the device of Figure 6.

In Figure 6 another modification has been shown in which a plurality of transparent elements are arranged on a common support and in which the support is moved so that the transparent tubular elements are successively positioned to receive or be associated with the light-directing means and to remain so positioned or associated while said means moves in some predetermined manner, such, for example, as by passing into and out of that particular tubular element. To this end, a housing, generally indicated at 75, is provided and this housing has a wall 76 having an opening 77 therein. To the outer surface of the wall is movably, in this example, rotatably attached by means generally indicated at 78, a disk 80. This disk merely represents a member which moves in any suitable manner, the movement being for the purpose of successively positioning the transparent elements for the purpose above mentioned.

To this movable element 80 are attached the tubular elements 81 in spaced and circularly aligned relation. Each element is connected by one open end in the manner substantially similar to the connection of the elements 23 and 51, in Figures 3 and 4. As shown, each element 81 has means for modifying the transmitted light to obtain figured or other types of illumination on the outer surface 83 of the movable element 80. This means is different for each element 81, as indicated by numerals 82, 84, 85. The light-directing means is generally indicated at 86 and the operating rod therefor is indicated at 87, this rod being slidably supported in the bearing 88.

Mechanism is provided for synchronizing the motions of the light-directing means 86 and the movable member 80 to cause the tubular elements to be successively positioned to receive the light-directing means, and remain so positioned while said means passes into and out of that tubular element. This means includes gearing, details of construction of which are claimed herein.

The movable member is provided on the inner side with a circular beveled rack indicated at 90 with which meshes a beveled gear 91 driven by gearing generally indicated at 92 including a spur gear 93. A motor 94 drives shaft 95 through suitable worm gearing generally indicated at 96. On shaft 95 is a spur drive gear 97 meshing with the corresponding driven gear 98 on shaft 99. On this shaft is also a spur gear segment 100 which is adapted to intermittently mesh with the gear 93 in the driving train for the support 83. On the same shaft 99 is a mutilated gear having gear portions respectively indicated at 101 and 102. The gear portion 101 meshes with the corresponding gear 103 of shaft 104. On this shaft is a crank 105 connected by link 106 with the light-directing means operating rod 87.

In Figure 6, the full-line parts are positioned as when the light-directing means 86 has completed a small part of its inward motion from the outer end of element 81. At the end of this motion, the parts 86, 87, 106 and 105 will occupy the dotted line position, and the portion 101 of the mutilated gear will be out of mesh with gear 103, to obtain a dwell of 86 at the dotted line position. At this time, the gear 100 will be positioned to start meshing with the gear 93, and on continued motion (the light-directing means being in the dotted line position), the rotatable disk 80 will be moved (in this instance one-eighth of a revolution) to bring another tubular element 81 into registration with the wall opening 77. During this last mentioned movement, the portion 102 of the mutilated gear will have moved to a position at which it will be ready to mesh with the gear 103 and subsequently move the light-directing means to its outermost position, where it will dwell until portion 101 again meshes with gear 103.

It can easily be seen that the cycle just mentioned is repeated as the motor operates, and that in each instance the light will move through the opening 77 into and lengthwise of the tubular element to its outer limit to dwell at that position, and will then move inwardly again through the openings to dwell at the dotted line position, during which dwell the disk 80 will be turned to bring another tubular element in alignment or registration with the well opening 77.

Thus far in the description of Figure 6 it has been said that the surface 83 of the element 80 is the one upon which the light figures are displayed. This assumes, of course, that the elements 81 are placed inwardly farther from the periphery than is shown in Figure 6. However, because of the positions of elements 81 in this figure, the light figures are also projected onto the surface 83ᵃ of the wall 76. Of course there is no intention to be limited in this regard, because it is obvious that in some instances the images may be projected partly upon the movable member 83 and partly upon the immovable wall 83ᵃ, and in other instances they may be projected only from a surface of the movable member.

Figure 8:
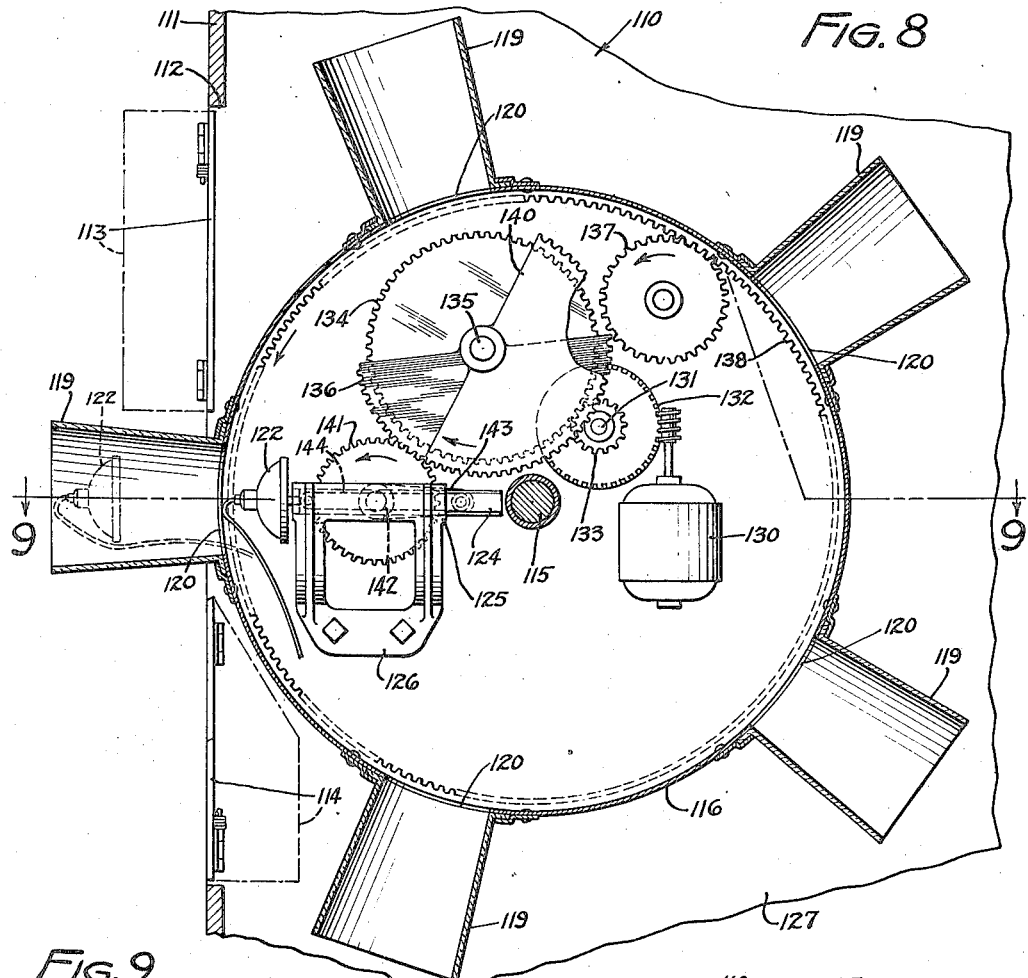
Figure 8 is another modification in which tubular elements are successively caused to open a self-closing door and pass through an opening closed by the door, to assume a predetermined relation with a light-directing means.
Figure 9:
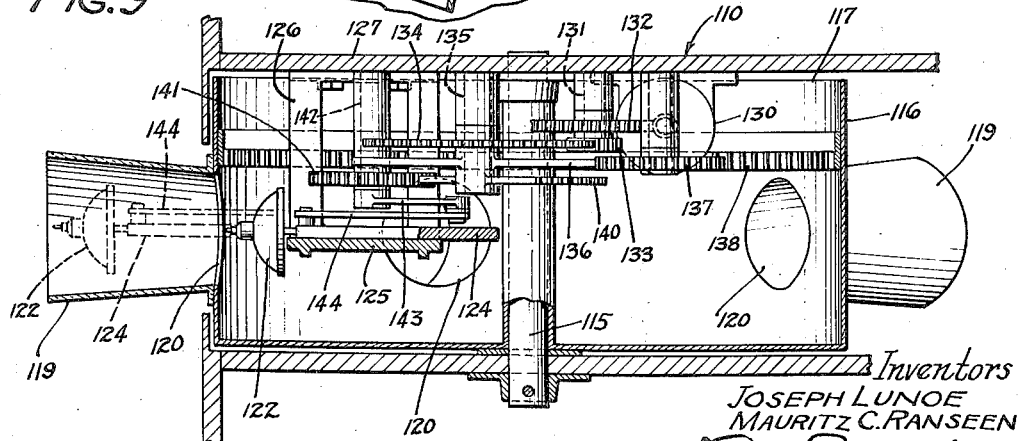
Figure 9 is a horizontal section taken approximately on line 9—9 of Figure 8.

In Figure 8 is shown another modification in which the tubular elements of light-transmitting material are carried by a movable member (in this instance a rotatable drum) and are adapted to successively open a self-closing door and pass through an opening closed by the door to lie in a position to illuminate the wall in which the opening is provided. The housing is indicated at 110 and the wall at 111. This wall has an opening indicated at 112, and this opening is closed by a pair of doors, one door 113 being arranged at the top and another door 114 being arranged at the bottom. These doors are spring-closing and normally occupy the position shown in full lines. Mounted within the housing on a shaft 115 is a drum 116, the shaft being attached to the housing 110. The drum is open at one side as at 117. Mounted on the outer side of the drum in spaced circumferentially aligned relation are a series of tubular elements, each made of light-transmitting materials. These elements are indicated at 119. They are attached in any suitable manner, each in register with an opening 120 of the drum and are open at both ends. The elements 119 are so arranged that a single element 119 only can open the door and project through the opening. These elements are shown as truncated cones convergent toward their points of attachment, but there is no intention to be limited entirely to the cross-sectional shape, nor to tapering, nor to the shape or character of the light-modifying means associated with them.

The light-directing means is indicated at 122, and in this instance is mounted on a slide 124 guided by suitable means generally indicated at 125 which means includes a bracket 126 attached to wall 127 of the housing 110. As in that form of the invention shown in Figure 6, means is provided for synchronizing the motions of the light-directing means and the movable member, to cause the tubular elements to successively open the doors, pass through the opening and be positioned to receive the light-directing means and remain so positioned while the said light-directing means passes into and out of that particular tubular element.

This means comprises a motor indicated 130 and controlling shaft 131 through worm gear 132. On the shaft 131 is a spur gear 133 in mesh with companion gear 134 of shaft 135. Mounted also on shaft 135 is a gear segment 136 adapted to mesh with gear 137, which in turn meshes with the interiorly arranged rack 138 of drum 116. Also on shaft 135 is a gear 140 adapted to mesh with gear 141 of shaft 142. To shaft 142 is attached a crank 143 connected with link 144, which link is in turn pivoted to the slide 124 which carries the light-directing means 122. All of the drum-operating gearing is of course mounted on an immovable wall 127 of the housing 110.

In Figure 8, the parts are in that position at which the light-directing means will begin its outward movement through the wall opening 112 and into a tubular element 119. Movement of the shaft 135 in clockwise direction from the position shown through an arc of 180° will result in the light-directing means 122 being moved from the full line to the dotted line position and rearwardly again to the full line position, due to meshed relation of gears 140 and 141. While this movement is taking place, the segment gear 136 is also moving through an arc of substantially 180° at the end of which movement it will be so positioned with reference to the gear 137 that on continued motion in the same direction (and while 122 is at the full line position) the drum will be rotated one-fifth of a revolution to bring the succeeding tubular element 119 past the doors 113, 114 to operative position in alignment with the light-directing means. Thus means is provided for causing each tubular element to successively register with or be opposed to the translative path of the light-directing means and to remain so opposed while said light-directing means passes through the opening and into and out of the corresponding tubular element.

It will of course be understood that various means for modifying the transmitted light to obtain figured or other characteristic and attractive illumination of any suitable surface will be used. We have found that beautiful symmetrical figures can be produced, which may be likened to the kaleidoscopic effects produced by reflections within tubes, but in this instance produced as a result of transmission of light through a transparent tubular element and its projection upon a surface, not necessarily a part of the tubular element and disposed outside of or surrounding the element. This surface is ordinarily perpendicular to the long axis of the tubular element, and the light-directing means is ordinarily moved along this axis from one end of the tubular member to the other. During this movement the character, shape and color of the light images constantly changes, the images being intricate in design and exceedingly attractive.

We do not wish to limit ourselves entirely to the details, although these are also claimed, but claim broadly the idea of directing light into a tubular light-transmitting element, so that it traverses the tubular wall of that element, to impinge any suitable surface to which an end of the tubular element is opposed.

We do not intend to limit ourselves as to the position of the light directing means within the tube, inasmuch as this means can be so positioned outside of the tube as to direct the light into the tube and through its tubular wall toward the surface to be illuminated. We further wish it understood that there is no intention to be limited to the shape of the tubular element, since the shape can be changed to get correspondingly different lighting effects.

We claim as our invention:

1. A device comprising a surface to be illuminated, a tubular element made of light-transmitting material and secured by one end to said surface, a curved reflector carried by said element at its opposite end and arranged outwardly beyond the tubular element for directing light through the wall of said tubular element and toward the surface, and a light source operatively associated with the reflector between it and said surface to be illuminated and also arranged outwardly beyond the tubular element.

2. A device providing a plurality of surfaces to be illuminated, a tubular element for each surface made of light-transmitting material and adapted to modify transmitted light to obtain figured illumination on the surface, each element having an end opposed to a corresponding surface, light-directing means for each element, and means for automatically axially moving said light-directing means one within each element to direct the light toward the corresponding surface.

3. A device providing a plurality of surfaces to be illuminated, a tubular element for each surface made of light-transmitting material, each element having an end opposed to a corresponding surface, light-directing means for each element, and means for simultaneously moving said means, one within each element, to direct light toward the surface.

4. A device providing a plurality of surfaces to be illuminated, a tubular element for each surface made of light-transmitting material, each element having an end opposed to a corresponding surface, a light for each element, and means for moving the lights, axially one within each element to direct light toward the surface including a movable support common to both lights.

5. A device comprising a surface to be illuminated, a tubular element made of light-transmitting material composed of sections, overlapped to provide zones of double and single thickness, said sections having ends opposed to the surface, both sections being adapted to modify transmitted light to obtain figured illumination on the surface, means for directing light through said tubular element toward the surface, and means for automatically moving the said light-directing means axially of and within the tubular element.

6. A device comprising a surface to be illuminated, a tubular element made of light-transmitting material composed of sections overlapped to provide zones of double and single thickness, one section having an end opposed to the surface, means for directing light outwardly through said tubular element toward the surface, both sections having facets extending lengthwise thereof adapted to modify transmitted light to produce figured illumination on said surface, and means for automatically moving said light-directing means axially of said tubular element.

7. A device comprising a movable member having a surface to be illuminated, tubular elements each attached by one end to the movable member, each being made of light-transmitting material, light-directing means mounted to move into and out of a corresponding tubular element and mechanism for synchronizing the motions of the light-directing means and the movable member to cause the tubular elements to be successively positioned to receive the light-directing means and remain so positioned while said means passes into and out of that tubular element.

8. A device comprising a movable member having a surface to be illuminated, tubular elements each attached by one end to the movable member in spaced and aligned relation, each being made of light-transmitting material, light-directing means mounted to move into and out of a corresponding tubular element to direct light toward that surface of the movable member to which the tubular elements are attached, and mechanism for synchronizing the motions of the light-directing means and the movable member to cause the tubular elements to be successively positioned to receive the light-directing means and remain so positioned while the light-directing means passes into and out of that tubular element.

9. A device comprising a wall having an opening, a movable member associated with the wall and having openings adapted to successively register with the opening of the wall, tubular elements carried by the movable member each made of light-transmitting material and having an open end in register with the corresponding opening of the wall, light-directing means mounted to move through the registered openings into, axially of and out of the corresponding tubular element to direct light toward that surface of the movable member to which the tubular elements are attached, and mechanism for synchronizing the motions of the light-directing means and the movable member to cause the openings of the movable member to successively register with said wall opening, and remain in register while the light-directing means passes through the openings and into and out of the corresponding tubular element.

10. A device comprising a wall having an opening and spring closing doors for the opening, a rotatable member arranged at one side of the wall and having attached thereto in spaced and aligned relation each by one end, tubular elements each made of light-transmitting material, said elements adapted to successively open the door and pass through the opening to lie at the opposite side of the wall, light-directing means mounted to move into and out of any tubular element after passage through the opening to a predetermined position for directing light toward the corresponding surface of the wall including the closed doors, and mechanism for synchronizing the motions of the light-directing means and the movable member to cause the tubular elements to successively open the door, pass through the openings and be positioned to receive the light-directing means and remain so positioned while said light-directing means passes into and out of that tubular element.

11. A device comprising a surface to be illuminated, a tubular element made of light-transmitting material having an end opposed to said surface, means for directing light through its wall and toward the surface, and means associated with said tubular element for modifying light passing through its wall to obtain figured illumination on the surface and means for automatically moving the light axially of the tubular element alternately in opposite directions.

12. A device providing a housing, two tubular light transmitting elements so associated with opposite surfaces of the housing that light passing through their tubular light-transmitting walls illuminates said surfaces, a light for each element, a support upon which the lights are carried, and means within the housing for moving the support axially of the tubular elements.

13. A casing providing surfaces to be illuminated, a tubular element for each surface made of light transmitting material having an end opposed to the surface, means within each element for directing light through said element and toward said surface and means for simultaneously axially moving said light directing means alternately in opposite directions.

14. A device comprising a surface to be illuminated, a movable member opposed to said surface, tubular elements of light-transmitting material attached to said movable member, means associated with the tubular wall of each element to modify the light as it passes through said light-transmitting material, light directing means mounted to move into and out of a corresponding tubular element, and mechanism for synchronizing the motions of the light directing means and the movable member to cause the tubular elements to be successively interposed to receive said light directing means and remain so positioned while said means passes into and out of said tubular element.

15. A device of the class described comprising a surface to be illuminated, a tubular element having its tubular wall formed of light-transmitting material, said element having an end opposed to said surface, axially adjustable means directing light within said tubular element and through its tubular wall to impinge said surface, and means associated with said tubular wall to modify the light as it passes through said light-transmitting material of said tubular wall to produce figured coronal illumination on said surface including elements which are radially related to the long axis of said tubular element, and by which the degree of inter-spacing, length and thickness of the radial elements are changed when said light directing means is axially adjusted.

16. A device of the class described comprising a surface to be illuminated, a tubular element having its tubular wall formed of light-transmitting material composed of sections overlapped to provide zones of varying thickness, said tubular element having an end opposed to said surface, means directing light within said tubular element and through the single and double thickness zones of its tubular wall to impinge said surface, and means associated with said tubular wall of each section to differentially modify the light transmitted through said zones to produce a figured radial illumination on said surface.

17. A device of the class described comprising a surface to be illuminated, a flared tube having an end opposed to said surface, said tube having a tubular surface having flared facets extending and flared lengthwise thereof, adjustable means for passing light within the tube and outwardly through its faceted tubular wall to impinge said surface and form a figured illumination composed of elements which are radial with respect to the long axis of the tube, whereby said radial elements can be changed in length, thickness and spacing for each adjusting position of the light passing means axially of the tube.

18. A device of the class described comprising a surface to be illuminated, a tubular element having its tubular wall formed of light transmitting material, and adapted to modify transmitted light to obtain figured illumination on the surface, said tubular element having an end opposed to said surface, a second element for directing light within and through the tubular wall of the tubular element to impinge said surface, and means for axially adjusting one of the elements.

19. A device of the class described comprising a surface to be illuminated, a tube having its tubular wall formed of light transmitting material, said tube having an end opposed to said surface, means directing light within the tubular element and through its tubular wall to impinge said surface, said means including a reflector and associated light in fixed relation, to limit the angular divergence of the rays in a predetermined manner, and means associated with said tubular wall to modify the light as it passes through said light transmitting material to produce figured coronal illumination composed of radial elements and means for continuously automatically moving the light with its associated reflector alternately in opposite directions.

20. A device comprising a surface to be illuminated, tubes each made of light transmitting material, and overlapped to provide zones of varying thickness, the long axis of the tubes pointing toward said surface, lighting means directing light within said tubes and outwardly through their tubular walls to impinge said surface, the tubular walls of the tubes having facets extending lengthwise and the facets of one tube being circumferentially off-set relatively to the facets of another, said facets acting to modify the light to produce coronal figured illumination including visually different figures the elements of each of which are substantially radially related to the axis of the tubes.

21. A device of the class described comprising a surface to be illuminated, a tubular element formed of light-transmitting material and having associated therewith means adapted to modify transmitted light to obtain figured illumination on the surface, said tubular element having an end opposed to said surface, and means for causing light to be automatically successively applied at different positions in a direction lengthwise of the tubular element and directed within and through the tubular wall of the element to impinge said surface, whereby the character of the figured illumination is changed for each position of application.

22. A device comprising a surface to be illuminated, a tube made of light transmitting material having an end opposed to the surface with the long axis of the tube pointing toward the surface, a lighting system causing light to pass outwardly through the tubular wall of the tubular element to impinge said surface, and plural means respectively successively arranged lengthwise of the tubular element, each means adapted to modify transmitted light to obtain visually distinct figured illumination on said surface, including figures the elements of which are substantially radially related to the axis of the tube.

23. A device of the class described comprising a surface to be illuminated, a tubular element formed of light transmitting material and having associated therewith plural means respectively successively arranged lengthwise of the tubular element, each means adapted to modify transmitted light to obtain visually distinct figured illumination on the surface, said tubular element having an end opposed to the surface, and means for causing light to be successively applied at different positions in direction lengthwise of the tubular element, to pass outwardly through the tubular wall and through said modifying means to impinge said surface.

JOSEPH LUNOE.
MAURITZ C. RANSEEN.